3,523,181
ELECTRIC COOKING UNIT
Silas V. Beasley, Elgin, Ill., assignor to McGraw-Edison Company, Elgin, Ill., a corporation of Delaware
Filed Jan. 18, 1968, Ser. No. 698,828
Int. Cl. A21b 1/00; F27d 11/00
U.S. Cl. 219—404                                   12 Claims

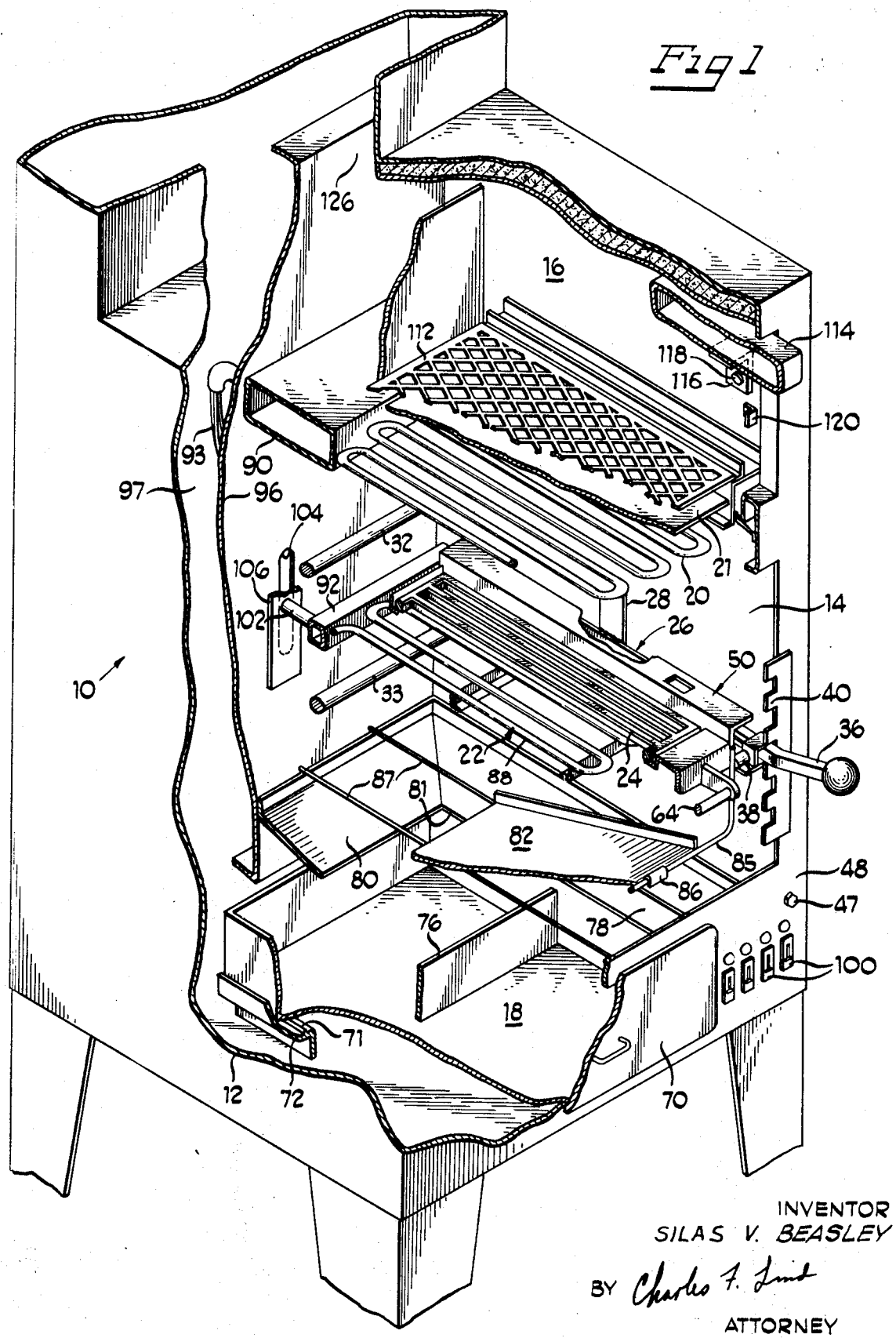

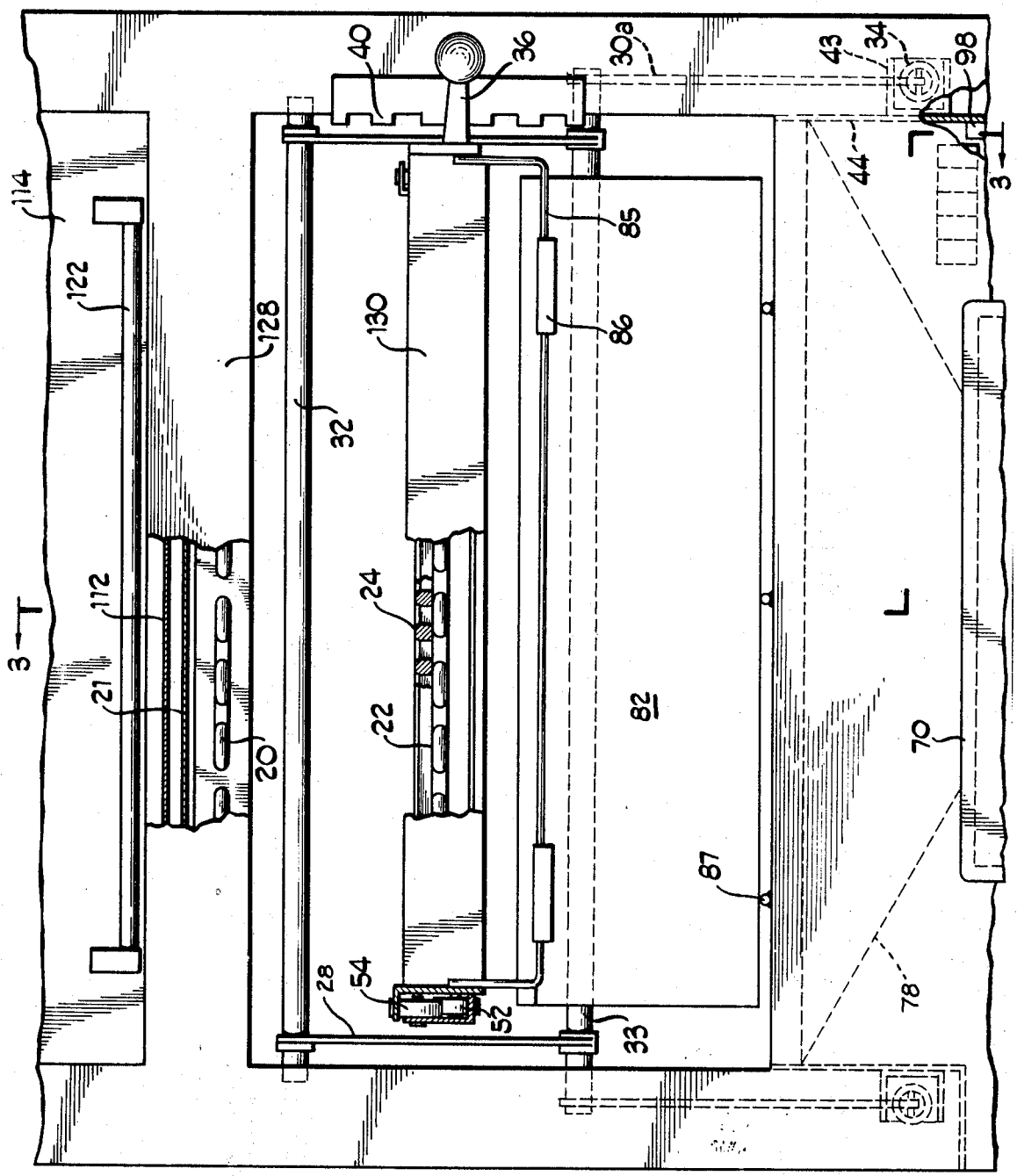

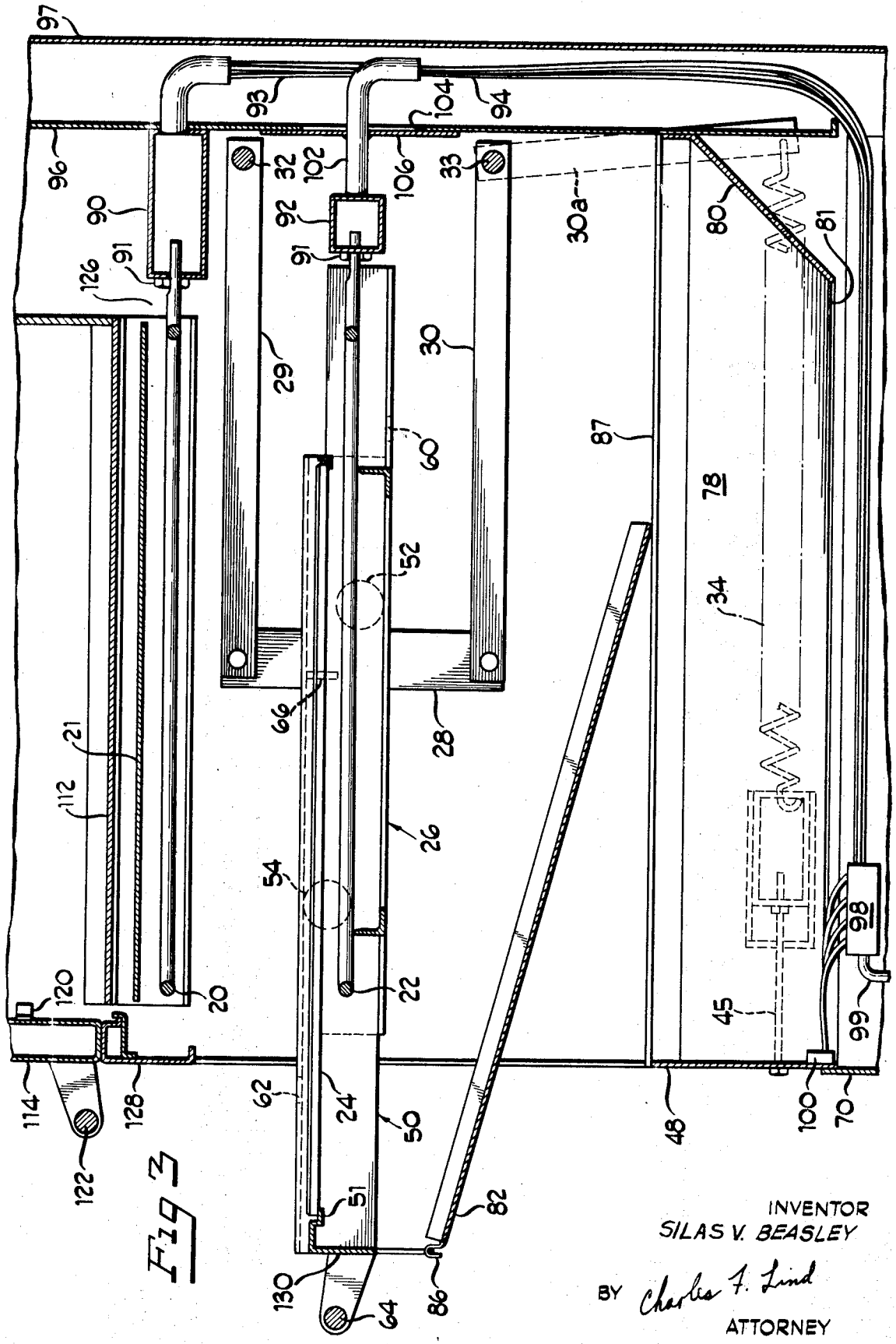

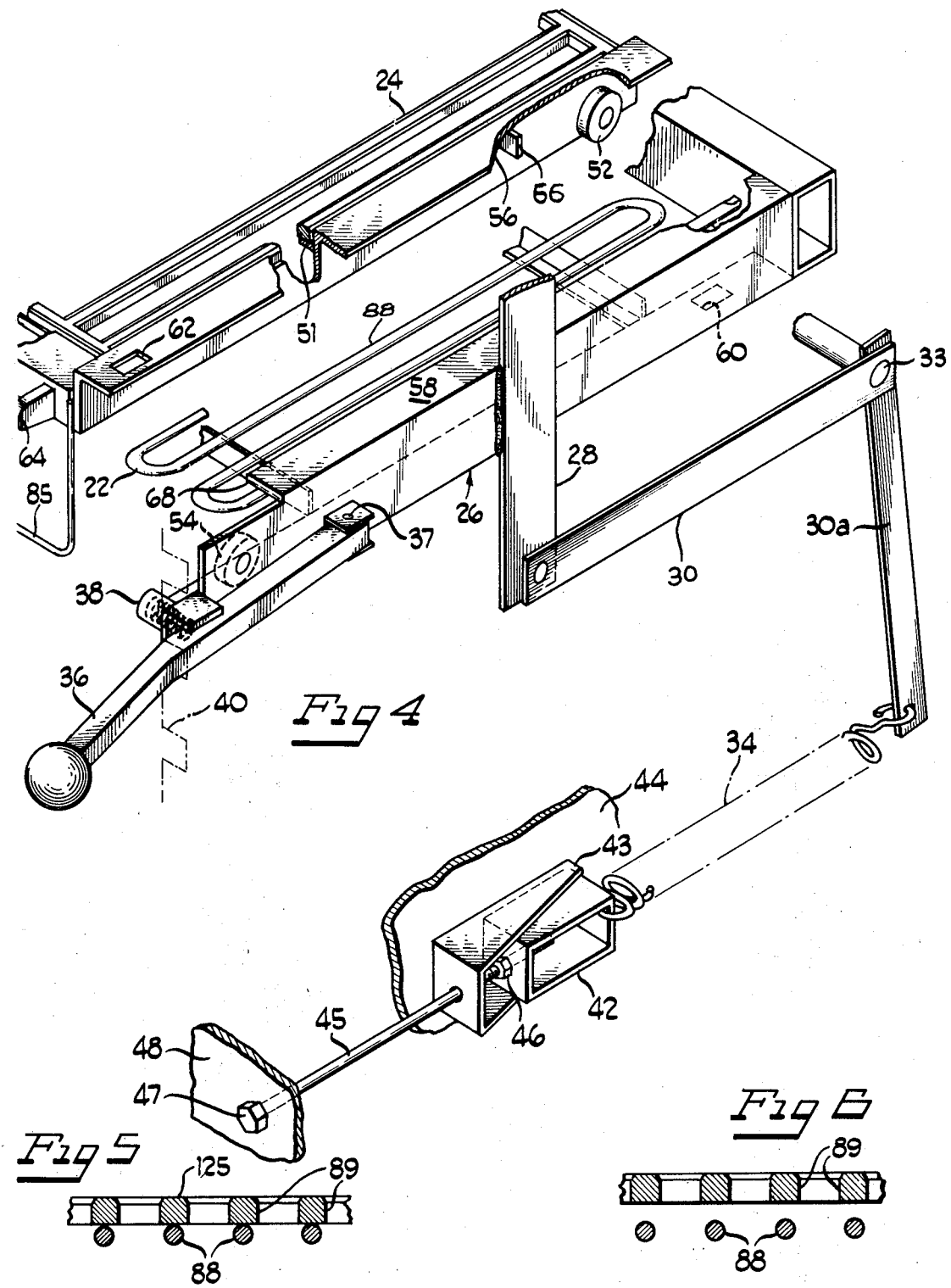

ABSTRACT OF THE DISCLOSURE

An electric cooking unit having a broiler section, upper and lower heated elements in this broiler section and a food supporting grill between the heating elements, the grill and lower heating element normally contacting one another and being vertically adjustable together relative to the upper heating element, the grill being separable from the lower heating element and removable from the broiler section for loading and unloading food thereon, a control for selectively energizing the heating elements, and an oven section located above the broiler section heated by the upper heating element.

---

In commercial or high output capacity food cooking units, the more versatile the unit the more readily it can be marketed and is accepted by restaurants and the like. For example, a four ounce lamb chop must be prepared differently than a sixteen ounce steak, and a single unit that can prepare each would be readily accepted.

This invention relates to a food cooking unit which is usable as a broiler and/or an oven, separately or simultaneously. More particularly, the invention relates to a broiler unit includiing upper and lower heating elements and an interpositioned food supporting grill, the lower heating element and food grill being movable as a unit to adjustble distance from the upper heating element, and the food supporting grill further being removable from the broiler section for convenient loading and unloading of food.

By varying the intensity and/or the location of heat application, the unit can be used for preparing both light or heavy cuts of meat. The invention also relates to a food cooking unit having an oven section located above the broiler section that is heated by the same upper heating element disposed in the broiler section. This separate oven section can simultaneously bake, warm or maintain heated complimentary items of food to be served with the same meat order.

Accordingly, a main object of this invention is to provide a food cooking unit that iis versatile, both in output capacity and the maner of use, and is therefore suitable for commercial use.

Another object of this invention is to provide a broiler unit including upper and lower heating elements and an interpositioned food supporting grill, the food supporting grill and lower heating element being movable to adjustable distances from the upper heating element and the food supporting grill being removable from the broiler section in any of these adjusted positions to accommodate loading and unloading of food.

Another object of this invention is to provide a broiler unit according to the previous object which accommodates self-cleaning of the food supporting grill merely by minimizing the separation of the heating elements to confine the food supporting grill closely therebetween and operating the heating elements simultaneously.

Another object of this invention is to provide a broiler unit including upper and lower heating elements and an interpositioned foor supporting grill resting in direct contact on the lower heating element, and a control to permit the separate and independent operation of the upper and lower heating elements.

Another object of this invention is to provide a broiler unit according to the previous object that permits the easy withdrawal of the food supporting grill from the broiler section for easy loading and unloading of food by initially vertically separating the grill and the lower heating element and thereafter horizontally withdrawing the grill from the broiler section.

Another object of this invention is to provide a food preparing unit having a broiler section including upper and lower heating elements, and having an oven section located above the broiler section that is heated by the upper heating element.

These and other objects of this invention will be readily understood and appreciated after reviewing the following specification, including the following drawings, wherein:

FIG. 1 is a perspective view, partially broken away and in section, of the subject food preparing unit, shown with the food grill partly withdrawn from the broiler section;

FIG. 2 is a front elevational view of the main operating components of the subject unit shown in a typical cooking position;

FIG. 3 is a sectional view as seen generally from line 3—3 in FIG. 2, except shown the food grill partly withdrawn from the broiler section;

FIG. 4 is an exploded perspective view showing various details of construction of the subject unit; and FIGS. 5 and 6 are sectional views of the food grill and lower heating element, as might be seen from FIGS. 2 and 3, respectively.

Referring now to the drawings, the unit 10 is shown to include a casing 12 defining a central broiler space or section 14, an upper oven space or section 16, and a lower waste space or section 18. Upper heating element 20 is secured between the oven and broiler sections, extending across the casing 12 in underlying relation to wall 21 which separates the oven and broiler sections. A lower heating element 22 and a food supporting grill 24 are movably supported by frame 26 within the casing to adjustable distances from and vertically below the upper heating element 20. To accommodate this adjustment, vertical elements 28 (FIGS. 3 and 4) are secured on opposite sides of the frame 26, and a parallel link 29 and a bell crank 30 are pivotally connected between the upper and lower ends of each element 28 and the casing at mounts 32 and 33, respectively. A spring 34 is connected to the bottom leg 30a of each bell crank 30 and counteract the weight of the frame, food grill and heating element 22, as well as the food cooking on the grill to permit easy vertical adjustment of the lower heating element and food grill. A handle 36 is pivoted at mount 37 (FIG. 4) to the frame 26 and is biased horizontally by spring 38 to cooperate releasably with a tooth track 40 for holding the frame and food grill at vertically adjusted distances from upper heating element 20. The counterbalancing tension on spring 34 can be adjusted as required by securing the opposite end of the spring to a bracket 42 which is guided between spaced plates 43 secured to casing wall 44, and threading a bolt 45 through a nut 46 secured to the bracket. The bolt extends through an opening in the front wall 48 of the casing, and the exposed head 47 thus can be rotated to move the bracket to vary the spring tension.

In addition to being adjustable vertically, the food grill is movable in a horizontal direction for partially withdrawing it from the broiler section for easy loading and unloading of food. The horizontal movement is accommodated by providing a separate frame 50 having a peripheral inner ledge 51 (FIG. 4) suitable for holding the food support grill 24, and having rollers 52 and 54 interposed between the frames 26 and 50. Specifically, the frame 50 for the food support grill rotatably supports rollers 52 and (only one being shown in FIG. 4) and has horizontal flanges 56, while the frame 26 rotatably rollers 54 and has horizontal flanges 58.

The rollers fit between the flanges to hold the grill 24 spaced above the lower heating element 22 to permit horizontal movement of the frames relative to one another. Each flange has an opening which is located to cooperate with its respective roller when the frame 50 is in the cooking position retracted completely within the broiler section (opening 60 being for roller 52 and opening 62 being for roller 54, respectively), to permit the food grill 24 to fall against and be supported directly on the lower heating element 22 (see FIG. 5). The frame 50 can be withdrawn horizontally from the broiler unit by pulling on handle 64, which causes the rollers to leave the openings and become confined again between the flanges to lift the food support grill 24 from the lower heating element (see FIG. 6). Engagement of tab 66 against roller 54 prevents the accidental removal of the frame 50 from the broiler, although, if it is desired to remove the frame entirely for cleaning purposes or otherwise, the frame can be removed by lifting its forward edge to lift tab 66 over the roller. The forward edge of each flange 58 is cut away as at 68 to permit the corresponding rollers 52 to be withdrawn also.

A grease tray or drawer 70 is supported in the waste section 18 in underlying relation to the food support grill 24 and lower heating element 22, and slides on beads 71 of angles 72 for removal from the casing. The drawer 70 is divided into cells by partition 76 to permit the easy removal of the drawer without spilling waste in the drawer. Deflectors 78 and 80 are disposed in downwardly converging relationship from the side and rear walls of the unit to a central opening 81 (FIGS. 1 and 3) that overlies the grease drawer 70. Also, deflector 82 is releasably supported by clip 86 to bar 85 in turn supported by the frame 50, and thus is pulled out with the frame 50 and rides along horizontal rails 87 extending front to rear of the casing. This deflector 82 always underlies the food grill 24 and thus keeps all drippings from the floor even when the grill is withdrawn from the broiler section.

The upper and lower heating elements 20 and 22 curve in a zig-zag serpentine pattern, the front to rear legs 88 of the lower heating element preferably underlying exactly the front to rear grid elements 89 on the food grill 24 (see FIGS. 2, 5 and 6). The terminal ends of the heating elements 20 and 22 extend into housing 90 and 92, respectively, and are secured in place typically by fittings 91. Flexible wire elements 93 and 94 extend through the casing between inner rear wall 96 and outer rear wall 97 to connect the heating element to terminal block 98, which in turn is connected to the input line 99 and to the control switches 100 at the front wall 48 of the unit. To protect the wires from the heat and to permit vertical movement of the lower heating element, a conduit 102 fits over the wires 94 from the housing 92 and extends through a vertically slotted opening 104 in rear inner wall 96, and a bar 106 secured to the conduit is positioned over and closes the openings 104. The flexible wires 94 for the lower heating element are thus raised and lowered during the vertical adjustment of the lower heating element.

The oven chamber 16 is separated by wall 21 from the upper heating element 20, and a food rack 112 is supported above this wall. The oven is open at the front, and a door 114 pivoted by bracket 116 through pin 118 to the casing 12 closes the opening. In the open position, the door is generally horizontal and slightly within the interior of the cavity out of the way of the working chef; while in the closed position, the door engages stop 120 and is thereby maintained vertical across the oven opening. The door is counter-balanced to permit the easy opening by the preferred method of gripping handle 122 with tongs and lifting the door approximately halfway open which thereafter fully opens by gravity, and likewise the door is closed by lowering it approximately halfway. The oven is heated by the upper heating element 20, and can be used for baking or as a warming unit to compliment the broiling unit previously described.

A vent 126 is located at the upper rear side of the unit, in communication with both the oven and broiler sections, and provides an outlet for any smoke created by cooking. Moreover, shields 128 and 130 are provided adjacent the heating elements at the front ends thereof to block direct line exposure from the upper and lower heating elements to the handles 122 and 64, respectively, to keep the handles from getting excessively hot. The front to rear legs 89 (FIG. 1) on the food grill are uninterrupted to permit a chef to ride a tong along the legs to pick up meat on the grill; and each leg is trapezoidal in shape having a rather narrow top food contacting surface 125. This brands the meat only along narrow lines and further permits grease drippings from the meat to escape past the grill to avoid a burnt taste in the meat.

In the electrical system, the heating elements are controlled by means of four circuit breaking switches 100 located on the front wall of the unit. Each upper and lower heating element is controlled independently by two of these switches so that the lower and upper heating elements can be energized separately as desired. Moreover, each upper and lower heating element is composed of two separate coils of like construction placed side by side and controlled by a switch, so that only part of either heating element can be operated by energizing only that particular coil.

One particular advantage of this invention is that with the adjustable spacing between the upper and lower heating elements, it is possible to move the heating elements very close to one another, and by operating both elements, to automatically clean the interposed grill 24. Also, with both heating elements operating, it is possible to brand meat by raising the grill and the meat thereon directly against the upper heating element. After the initial branding, the meat can be removed from the broiler or moved to a lower position for further slower cooking. Further, by operating only the lower heating element and not the upper heating element, light cut meats can be cooked directly on the food grill from power obtained solely from the lower heating element. For higher output cooking, such as for large steaks, the upper element is also operated along with the lower heating element.

What is claimed is:

1. A combination broiler oven, comprising a casing defining an intermediate broiler section, a lower grease collecting section, and an upper oven section, a partition disposed between the oven and broiler sections; an upper heating element supported by the casing within the broiler section in underlying relationship to the partition; a frame in the broiler section; a lower heating element supported by the frame; a grill supported by the frame in substantially contacting, overlying relationship to the lower heating element; means including levers supporting the frame relative to the casing to move the frame, grill and lower heating element vertically in the broiler section to adjustable distances from the upper heating element; registrable lock means between the frame and casing for holding the frame, grill and lower heating element as vertically adjusted; means between the grill and the frame for initially separating vertically the grill and the lower heating element and thereafter moving the grill horizontally from the broiler section to a food unloading and loading position projecting from the broiler section; a tray supported by the casing in the grease collecting section in underlying communicating relationship to the broiler section, and movable therefrom horizontally entirely from the grease collecting section to permit easy emptying of the tray; said casing being open on one side of the oven section, and a door pivoted to the casing for closing the one open side to define the oven section; and means for venting both the broiler and oven sections.

2. A combination broiler oven according to claim 1, wherein a spring between the casing and the levers counter-acts the weight of the frame, grill and lower heating element to accommodate relative easy vertical adjustment within the broiler section.

3. A combination broiler oven according to claim 2, wherein a threaded shaft is support by the casing for adjusting the force of the spring and thereby the counteracting effect on the frame, grill and lower heating element.

4. A combination broiler oven according to claim 1, wherein baffles project downwardly and inwardly from the lower extremities of the broiler section to a grease drain opening overlying the tray supported in the grease collecting section.

5. A combination broiler oven according to claim 1, wherein control means are provided to operate upper and lower heating element separately and/or together, as desired.

6. A broiler unit, comprising a casing defining a broiler section and an underlying grease collecting section; an upper heating element secured to the casing within the broiler section at an uppermost location therein; a frame in the broiler section and means supporting the frame relative to the casing to move the frame vertically to adjustable distances from the upper heating element, means between the frame and casing for holding the frame as vertically adjusted; a lower heating element carried by the frame and moved therewith within the broiler section, a grill also carried by the frame and moved therewith in the broiler section, said grill normally contacting the lower heating element and means between the frame and grill operable initially to elevate the grill from contact with the lower heating element and thereafter to move the grill to a food unloading and loading position projecting from the open side of the broiler section, and said last mentioned means including cooperating track and roller elements between the frame and grill, the track elements being uniform at all locations contacted by the roller elements when the grill is between its operative food preparing position within the casing and the unloading and loading position projecting from the casing and being arranged to hold said grill and lower heating element separated from one another, and having non-uniformities at the remaining locations normally occupied by the roller elements when the grill is in its operative food preparing position operable to permit the grill and lower heating element to move into contact against one another; a tray supported by the casing in the grease collecting section in underlying communicating relationship to the broiler section; and means for venting the broiler section.

7. A broiler unit according to claim 6 wherein a baffle is supported in underlying relation to the grill, and is removed from the casing with the grill to the unloading and loading position, whereat the baffle is disposed at least partially over the tray in the grease collecting section.

8. A food preparing unit, comprising a casing having a transverse partition and defining a broiler section underlying the partition and an oven section overlying the partition, each section being open on one side and a door pivoted to the casing for closing said oven section open side; an upper heating element secured to the casing within the broiler section in underlying relationship to the partition; a frame in the broiler section, means supporting the frame relative to the casing to move the frame vertically to adjustable distances from the upper heating element, and means between the frame and casing for holding the frame as vertically adjusted; a lower heating element carried by the frame and moved therewith within the broiler section, a grill also carried by the frame and moved therewith in the broiler section, said grill in its normal operative position contacting the lower heating element and means between the frame and grill operable initially to elevate the grill from contact with the lower heating element and thereafter to carry the grill to a food unloading and loading position projecting from the open side of the broiler section, said last mentioned means including cooperating track and roller elements secured to the frame and grill, the track elements extending toward the open side of the broiler section generally uniformly at all locations contacted by the roller elements when the grill is between the normal operative and the unloading and loading positions to hold said grill and lower heating element separated from one another, and having non-uniformities at the remaining locations normally occupied by the roller elements when the grill is in its operative position to permit the grill and lower heating element to contact one another; and means for venting both the oven and broiler sections.

9. A food preparing unit, comprising a casing defining a broiler section open on one side, an upper heating element secured to the casing within the broiler section at an uppermost location therein; a frame in the broiler section, means supporting the frame relative to the casing to move the frame vertically to adjustable distances from the upper heating element, and means between the frame and casing for holding the frame as vertically adjusted; a lower heating element carried by the frame and moved therewith within the broiler section, a grill also carried by the frame and moved therewith in the broiler section, said grill in its normal operative position contacting the lower heating element and cooperating track and follower means between the frame and grill extended toward the open side of the broiler section operable initially to elevate the grill from contact with the lower heating element and thereafter to carry the grill to a food unloading and loading position projecting from the open side of the broiler section, and said track means having irregular portions cooperating with the follower means when the grill is in its said normal position to accommodate the grill contacting the lower heating element.

10. A broiler unit according to claim 9, wherein a power terminal is mounted on the casing, and wherein flexible conductor means are connected between the power terminal and the lower heating element and are disposed in a generally arcuate configuration that is distended as the vertical adjustment of the lower heating element is made.

11. A broiler unit according to claim 10, wherein the casing includes separated outer and inner walls, wherein the flexible conductor means are disposed between the walls, and wherein said inner wall has an opening elongated in the direction of vertical adjustment of the lower heating element and a bar is secured relative to a portion of the conductor means and disposed movably adjacent the inner wall covering the slot.

12. A broiler unit, comprising a casing defining a broiler section and an underlying grease collecting section; an upper heating element secured to the casing within the broiler section at an uppermost location therein; a frame in the broiler section and means supporting the frame relative to the casing to move the frame vertically to adjustable distances from the upper heating element, means between the frame and casing for holding the frame as vertically adjusted; a lower heating element carried by the frame and moved therewith within the broiler section, a grill also carried by the frame and moved therewith in the broiler section, said grill normally contacting the lower heating element and cooperating track and follower means between the frame and grill operable initially to elevate the grill from contact with the lower heating element and thereafter to move the grill to a food unloading and loading position projecting from the open side of the broiler section, and having irregular portions cooperating with the follower means when the grill is in its said normal position; said casing including in the grease collecting section horizontal rails having raised beads of narrow cross section, a tray slidably supported by the casing on the beads in underlying communicating relationship to the broiler section, and being removable from the casing through an opening therein to permit the ready emptying of the tray; and means for venting the broiler section.

References Cited

UNITED STATES PATENTS

| | | | |
|---|---|---|---|
| 2,557,832 | 6/1951 | McCormick | 219—392 |
| 2,767,298 | 10/1956 | Fry | 219—403 X |
| 2,984,730 | 5/1961 | Ostrom et al. | 219—395 |
| 3,193,663 | 7/1965 | Budzich et al. | 219—392 X |

HIRAM B. GILSON, Primary Examiner

U.S. Cl. X.R.

219—202